(12) United States Patent
Nishikawa et al.

(10) Patent No.: US 6,859,608 B1
(45) Date of Patent: Feb. 22, 2005

(54) AUTO TITLE FRAMES GENERATION METHOD AND APPARATUS

(75) Inventors: Yuko S. Nishikawa, San Diego, CA (US); Kim Mingo, New York, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/466,996

(22) Filed: Dec. 10, 1999

(51) Int. Cl.[7] .............................................. H04N 5/91
(52) U.S. Cl. ........................ 386/46; 386/83; 386/52; 386/95
(58) Field of Search ........................... 386/83, 95, 69, 386/70, 52, 46; 348/460, 722, 589, 600; H04N 5/91

(56) References Cited

U.S. PATENT DOCUMENTS

| | | | |
|---|---|---|---|
| 5,469,224 A | * | 11/1995 | Her .............................. 386/52 |
| 5,930,449 A | * | 7/1999 | Hwang .......................... 386/95 |
| 6,215,951 B1 | * | 4/2001 | Hailey ........................... 386/83 |
| 6,487,362 B1 | * | 11/2002 | Yuen et al. .................... 386/83 |

* cited by examiner

Primary Examiner—Vincent Boccio
(74) Attorney, Agent, or Firm—Blakely, Sokoloff, Taylor & Zafman LLP (57) ABSTRACT

A method and apparatus that provides a user a capability to create a title frame for recording when the user records a broadcasted program onto a recording device, using program data received from the broadcasted television transmission. The transmitted program data contains data on the genre or category and subcategory of the program. In one embodiment, the system recognizes the program data and selects the appropriate graphic treatment for the title frame based on the genre information of the program. The information extracted from the program data and placed in the title frame may include the program title, the program description, rating, time length, and program logo or image.

18 Claims, 12 Drawing Sheets

AUTO TITLE FRAMES GENERATION METHOD AND APPARATUS

FIELD OF THE INVENTION

The present invention relates to the field of satellite broadcasting. More specifically, the invention relates to receiving broadcasting signals and recording the signals to an external recording device.

ART BACKGROUND

Television broadcasting technology has improved tremendously since its inception. Today, television signals are broadcasted on the airwaves through cables and via satellite. The number of stations accessible today has increased from one to hundreds of stations. To select a program to view, many users simply "channel surf" until they find a channel that has a desirable program. Channel surfing refers to the process of using the channel "+" or "–" key to sequentially view each channel. Although some users find channel surfing among hundreds of stations enjoyable, most users prefer a more direct method for selecting a program to view.

Figure 1A:
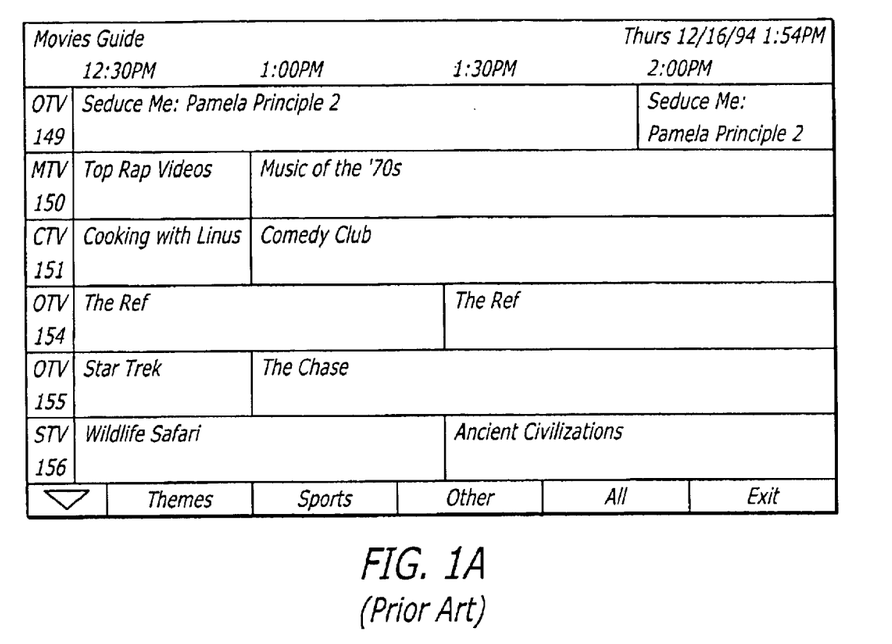
FIG. 1A is a simplified illustration of a prior art direct digital satellite system guide display.

Some systems, for example, the RCA Direct Satellite System™ or DSS™ (Direct Satellite System and DSS are trademarks of Hughes Communications, a division of General Motors Corp.), provides a television channel selection guide which displays a listing of the channels typically in numeric order and the titles of the programs broadcasted on the channels. A simplified block diagram of such a guide is illustrated in FIG. 1A. This system has a number of drawbacks. The guide provides only the title of the program. To get additional information, such as a written description of the program, the user must select an information button bringing up a second layer of the menu having the program description.

Figure 1B:
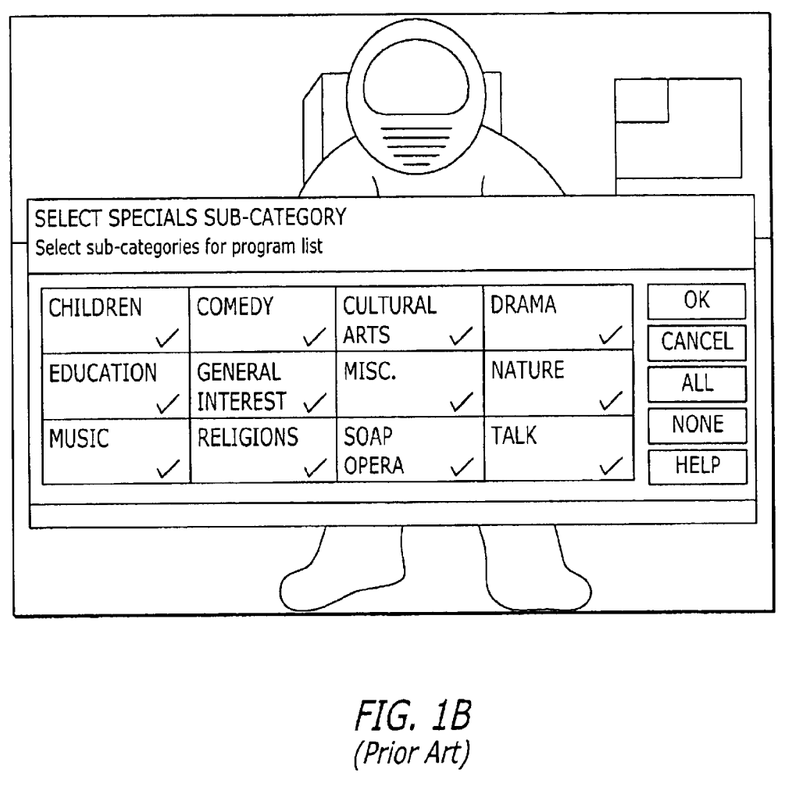
FIG. 1B is a simplified illustration of a prior art categorical programming guide as presented by Sony DSS system.

Other approaches use program oriented electronic programming guide instead of channel oriented programming guide as described above. In program oriented electronic programming guide, the program information is displayed to the user independent of channel information. FIG. 1B shows an example of a display of a menu of the program oriented programming guide. The screen display allows a user to further define the programs the user is interested in, independently of the channels where the programs are shown.

Once the user of the system selects a channel and a desired program, instead of immediately viewing the program, the user may elect to record the program onto a recording device so that the program can be viewed at a later time. When this is the case, regardless of whether the system provides channel oriented programming guide or program oriented programming guide, only the content of the program will be recorded. The title of the program and the description of the program that the user was presented is not part of the recorded program.

SUMMARY OF THE INVENTION

The present invention discloses a method and apparatus for automatic generation and selection of title frames for insertion into recordings.

The present invention provides a user a capability to create a title frame for recording when the user records a broadcasted program onto a recording device. In one embodiment, the title frame includes descriptive information regarding the recording following program data received from the broadcasted television transmission used to generate the title frame. In one embodiment, the transmitted program data contains content data on the genre or category and subcategory of the program. When the automatic generation of title frame recording option is activated, in one embodiment, the present invention recognizes the program data and selects the appropriate graphic treatment for the title frame based on the genre information of the program. The information is extracted from the program data and placed in the title frame. The information placed in the title frame may include the program title, the program description, rating, time length, background or marquee graphic treatments, and program logo or image.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described is a direct broadcast satellite system. However, it is readily apparent to one skilled in the art that other transmission or broadcast systems, including those that broadcast digital television and high definition television having the capability of receiving and displaying a multiplicity of stations may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well-known electrical structures and circuits are shown in block diagram form in order not to unnecessarily obscure the present invention.

Figure 2:
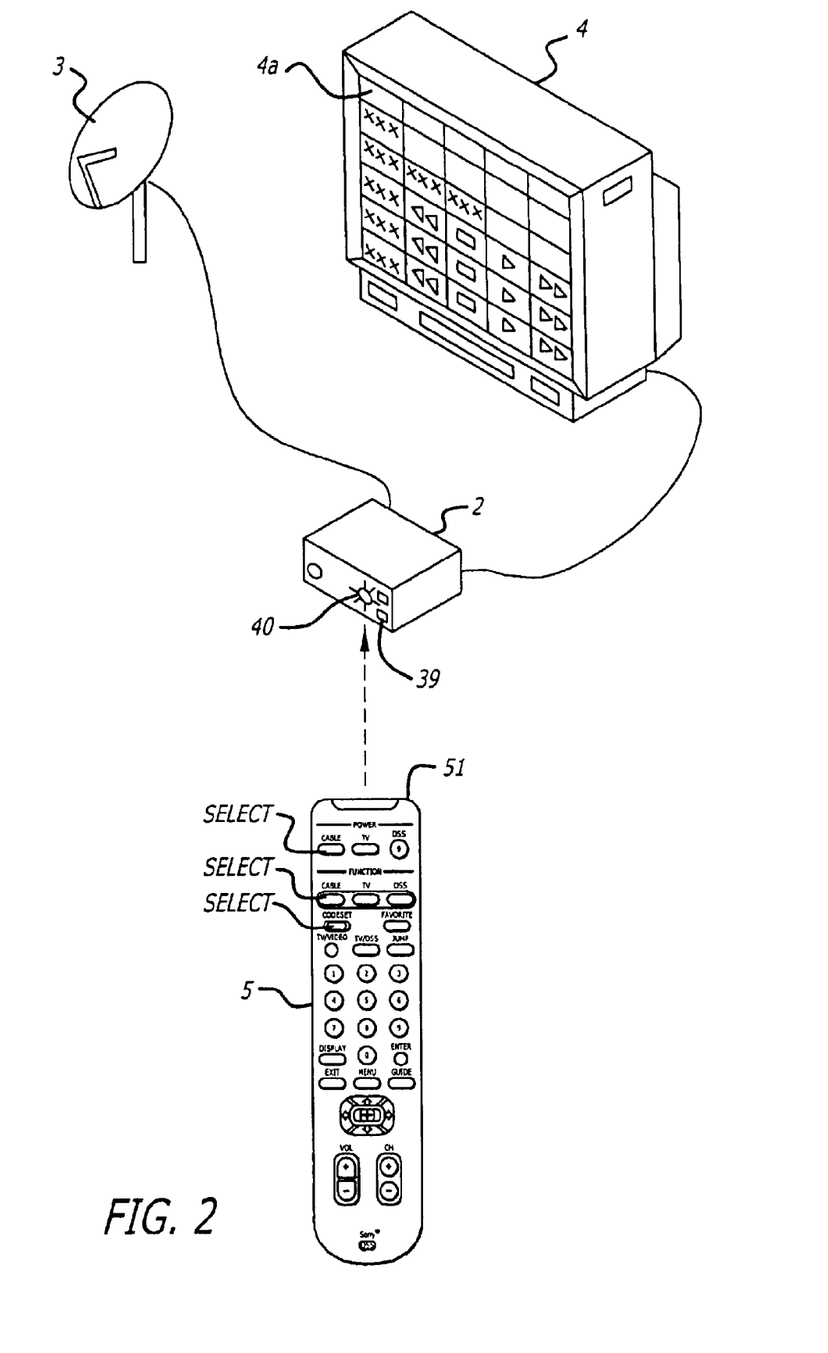
FIG. 2 is a simplified illustration of one embodiment of a direct satellite system.

FIG. 2 is a simplified diagram illustrating one embodiment of a Direct Satellite System (DSS). The system has an antenna 201, an integrated receiver/decoder (IRD) 202, a remote controller 203 and a monitor 204. The packets are transmitted by a transponder on the satellite. Each transponder transmits data in a time share manner at a predetermined frequency. A tuner of a decoder in the IRD 202 is tuned into the frequency of the transponder corresponding to a channel, which is designated by a viewer so that the packets of digital data are received by the decoder.

Figure 3:
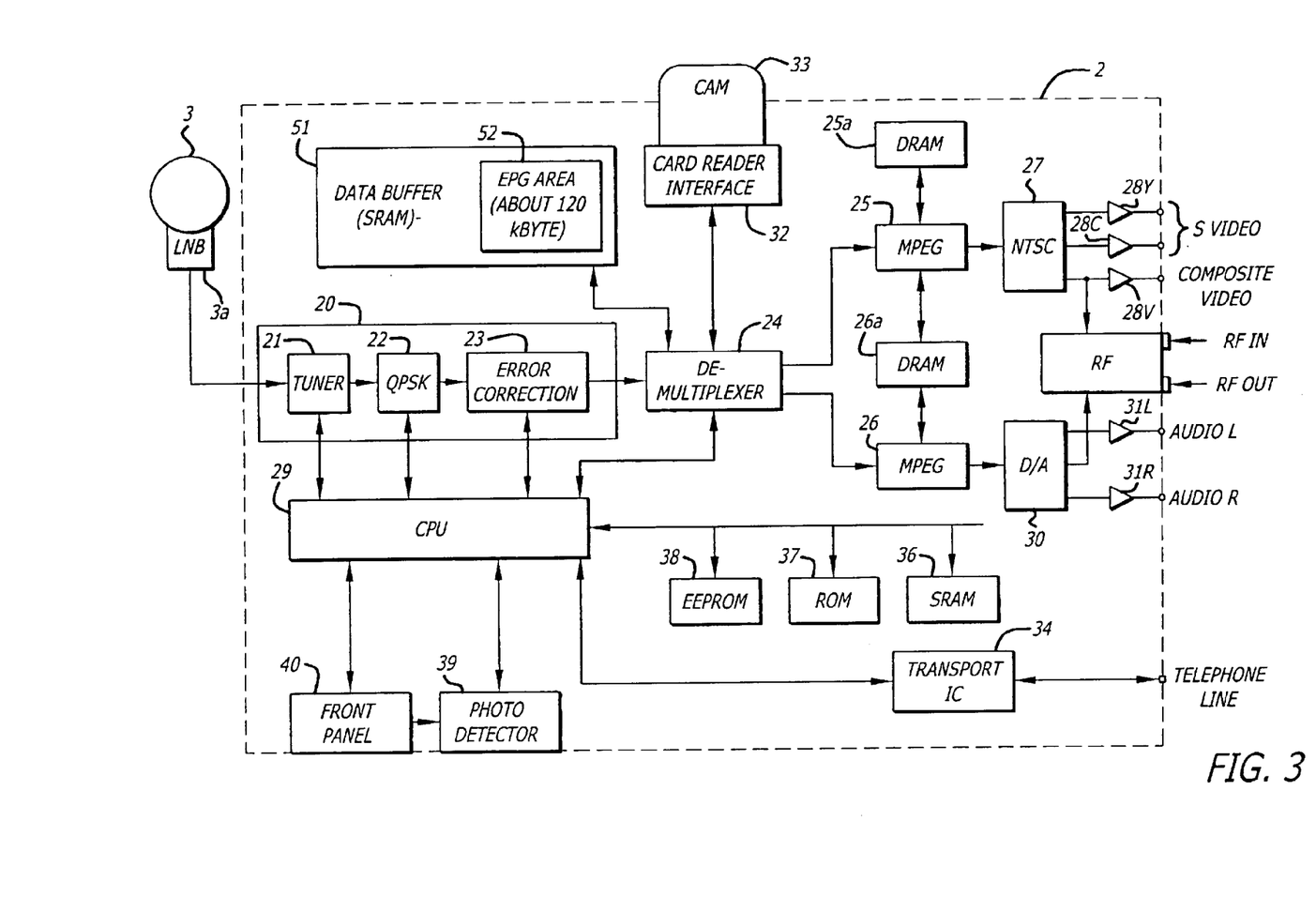
FIG. 3 is a block diagram representation of one embodiment of the elements utilized in the receiver of the television signals.

FIG. 3 is a block diagram of the IRD 202. The antenna 201 receives an encoded data signal sent from a satellite. The received encoded signal is decoded by the IRD. The antenna 201 has a low noise block down converter 3a (LNB). The LNB 3a converts a frequency of a signal sent from the satellite to another frequency. The converted signal is supplied to the IRD 202. The monitor 204 receives a signal from the IRD 202. A radio frequency (RF) signal output from the LNB 3a of the antenna 201 is supplied to a tuner 21 of a front end 20. The output from the tuner 21 is supplied to a QPSK demodulation circuit 22 for demodulation. The output from the QPSK demodulation circuit 22 is supplied to an error correcting circuit 23 for error correction. The data is received in encrypted and encoded (i.e., compressed) form.

The transport IC 24 receives the data stream, consisting of packets of data, from the error correcting circuit 23 and directs portions of the data stream to the appropriate circuit for processing. The digital data stream sent from a satellite includes headers for classifying the different portions of the data in the digital data stream. The transport IC stores the headers in registers and uses the headers to direct the data. The data stream sent from the satellite includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG.

A conditional access module 33 (CAM) includes a CPU, a ROM and a RAM. The conditional access module determines whether the user has the authorization to receive certain data, e.g., audio/video for a pay-TV station, using the authorization information stored in its memory. Thus, if the conditional access module determines that the user has authorized access, a key to decrypt the incoming data is provided to the transport IC 24, which decrypts the data using the key provided. In the present embodiment, a smart card is utilized. This card is inserted into the card reader interface 32 for interface to the transport IC 24. It is readily apparent to one skilled in the art that the conditional access module is not limited to smart cards and may be configured in other kinds of circuitry.

The MPEG video decoder 25 decodes the video signal received from the transport IC. DRAM 25a, connected to the MPEG video decoder 25, is used for buffering and storage of video data during processing by the MTEG video decoder. The decoded digital video signal is supplied to an NTSC encoder 27 and converted to a luminance signal (Y) and a chroma signal (C) which are respectively output through a buffer amplifier 28Y or 28C as an S video signal. A composite video signal is also output through a buffer amplifier 28V.

The MPEG audio decoder 26 decodes the digital audio signal. DRAM 26a, connected to the MPEG audio decoder 26, is used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R.

An RF modulator 41 mixes a composite signal output from the NTSC encoder 27 with an analog audio signal output from the D/A converter 30. The RF modulator 41 converts the mixed signal into an RF signal and outputs the RF signal therefrom.

The CPU 29 is the central control mechanism and executes code stored in the ROM 37 to perform certain functions of the system. For example, the CPU processes certain data to control the generation of the program list in accordance with the teachings of the present invention. In addition, the CPU receives and processes the user input, received from the front panel buttons or switches 40 and the photo-detector circuit 39 to provide the user functionality and access to the system described herein. In addition, the CPU accesses user settings/preferences for processing of information and configuration of the system. The user settings are stored in the non-volatile memory, such as EEPROM 38. In addition, the CPU maintains a list of pointers, stored in SRAM 36, to the channel information and program information stored in the SRAM 51. Thus, when a user wishes to display a form of the EPG on the screen, the CPU 29, accessing pointers stored in the SRAM 36, communicates to the transport IC 34 to retrieve the data from the data buffer (SRAM) 51 identified by the pointers. The CPU formulates the format and other digital data which forms the guide or list on the screen and forwards the data representative of the guide/list to the transport IC 34 which forwards data the DRAM 25a of the MPEG video decoder 25 for subsequent output to the screen. Furthermore, in one embodiment, the CPU utilizes such information and executes code stored on media to control the generation of title frames in accordance with the teachings of the present invention.

Figure 4:
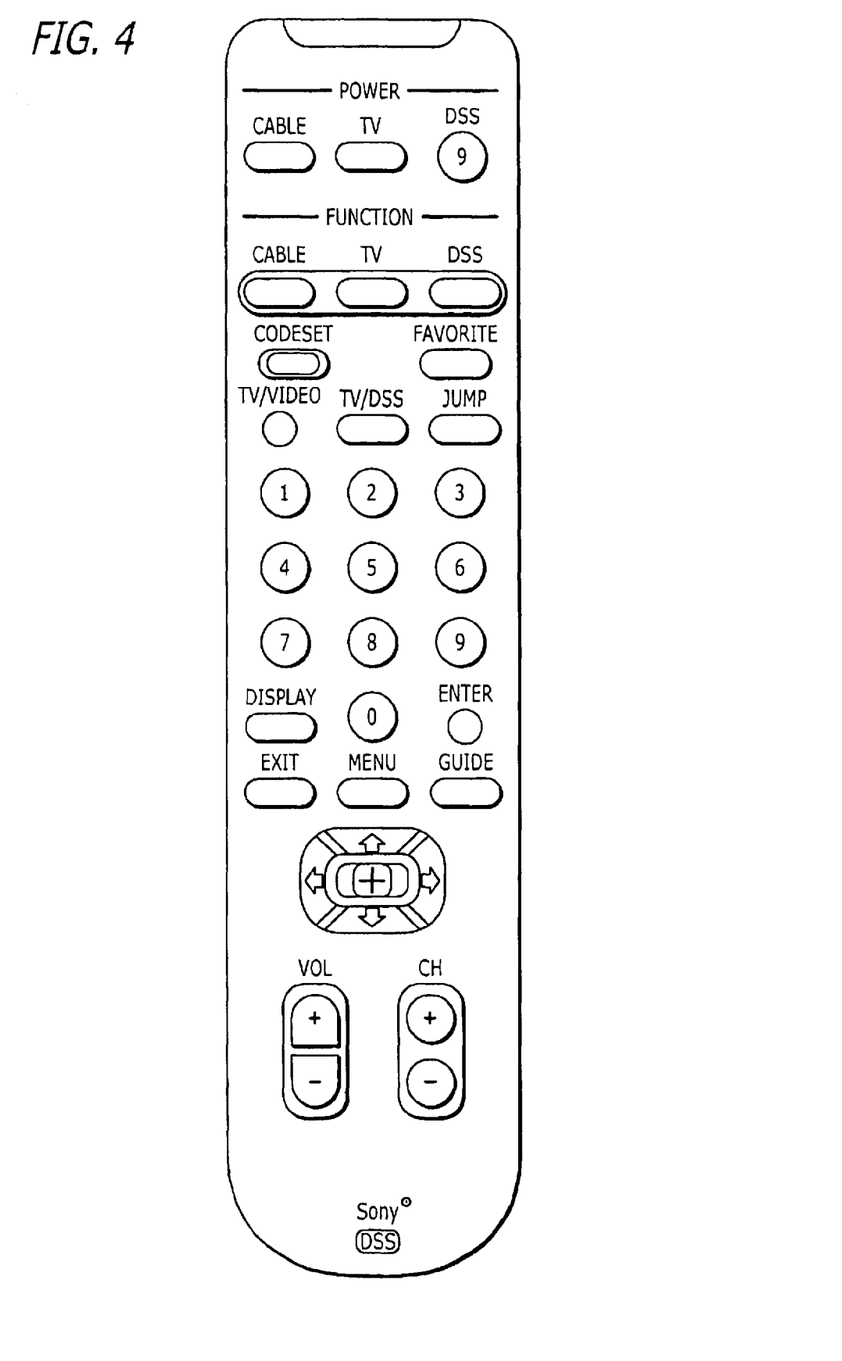
FIG. 4 is a representation of one embodiment of a remote controller utilized to tune television stations in accordance with the teachings of the present invention.
Figure 5:
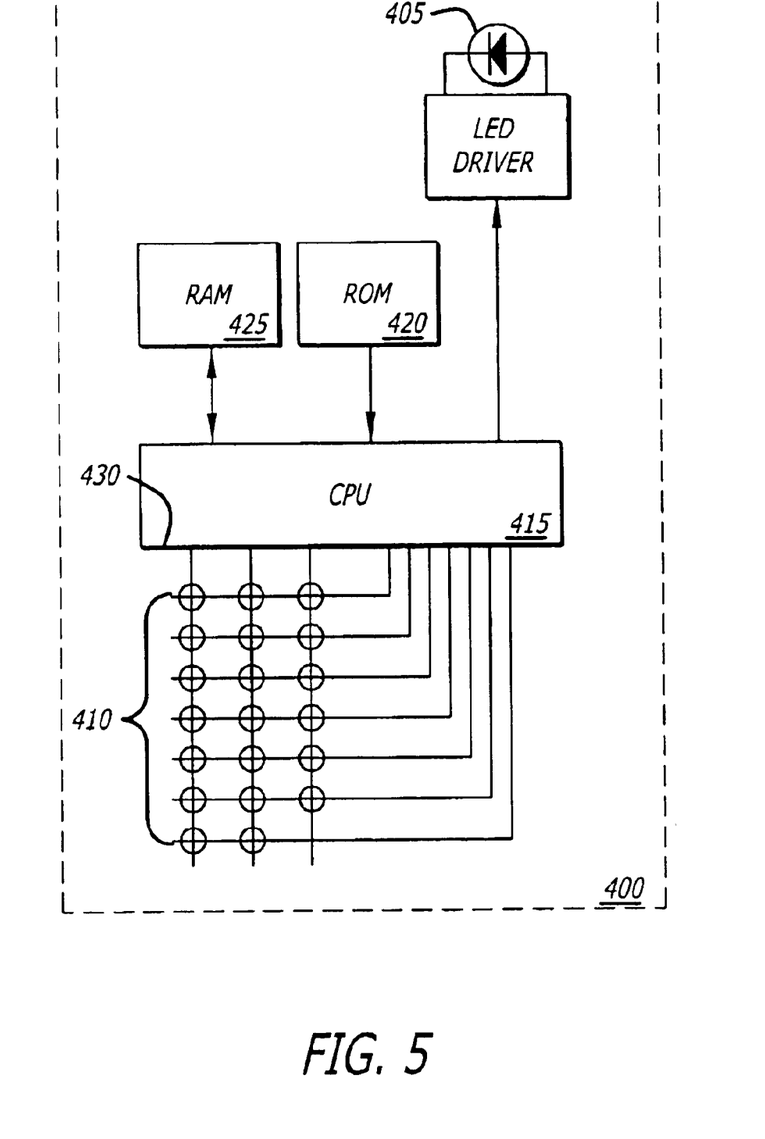
FIG. 5 is a simplified block diagram of an exemplary circuitry utilized in a remote control device.

FIG. 4 shows an example of a remote controller utilized by a user to transmit commands and make program selections in accordance with the teachings of the present invention. FIG. 5 is simplified a block diagram of the remote controller. The remote controller 400 has an infrared originating device 405, a set of operation buttons 410, a CPU 415, a ROM 420 and a RAM 425. The CPU 415 receives a signal sent from an operation button 410 through an input port 430. The signal is processed according to a program stored in the ROM 420. The RAM 425 is used as a working space so as to produce a transmitting ode. The transmitting code is sent to the infrared originating device 405 through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad and an "ENTER" key. In one embodiment, the set of operation buttons 410 also enables the user to activate title frame recording using information from the electronic programming guide in accordance with the teachings of the present invention.

Figure 6:
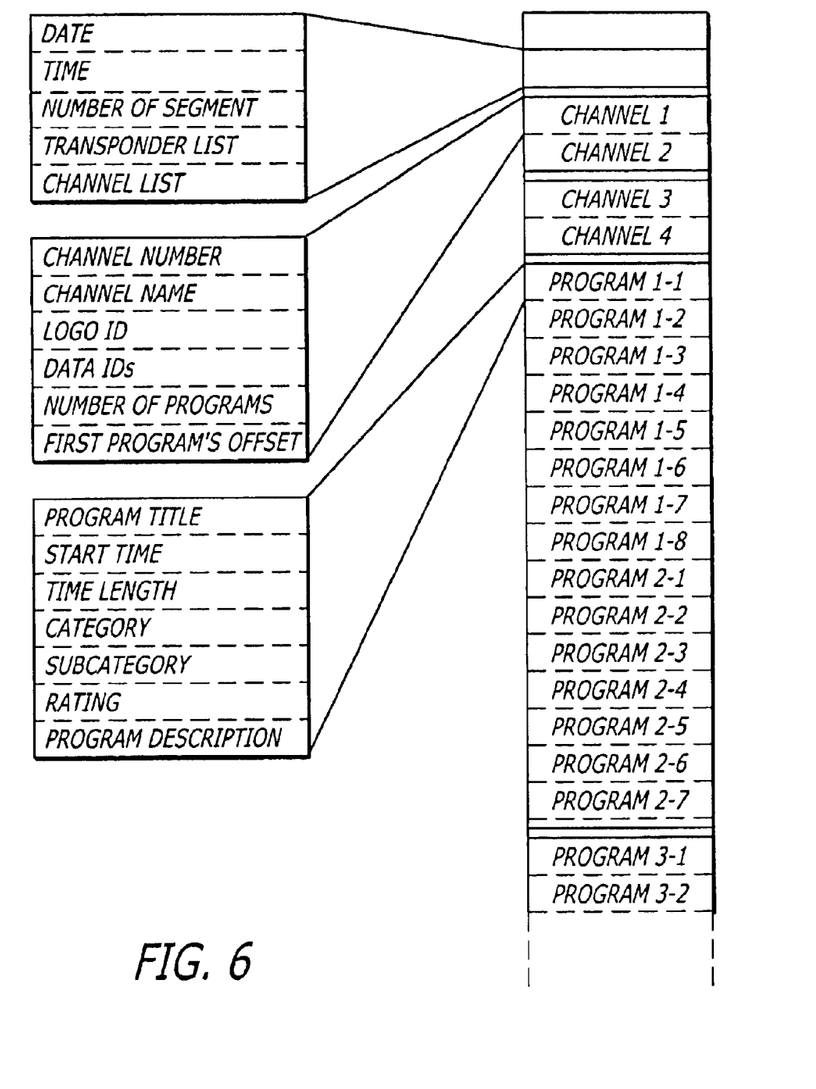
FIG. 6 illustrates one embodiment of the program data utilized to generate the information in the title frame.

FIG. 6 is a block diagram illustration of the data stored in a portion of the data buffer RAM 51. The data buffer RAM 51 stores EPG data including guide data, channel data and program data. General information is included in the guide data, for example, the current data and time. The transponder list identifies the number of the transponder transmitting a segment. The channel list identifies the channel number of the first channel of a portion of data. The channel data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined timeframe, first program offset which identifies the offset from the header to the first channel data in a segment.

The program data includes the program title 601, start time of the program 602, time length of the program 603, program genre or category 604 such as movies, news, sports, etc., program sub-category 605 such as drama, horror, children's movies or baseball, basketball, football for the sports category, the movie rating 606 and program description 607 that provides a detailed description of the program. Using this information from the broadcast, program information is provided to the user. In one embodiment of the present invention, the program information is extracted from the EPG data to generate the title frame.

Figure 7:
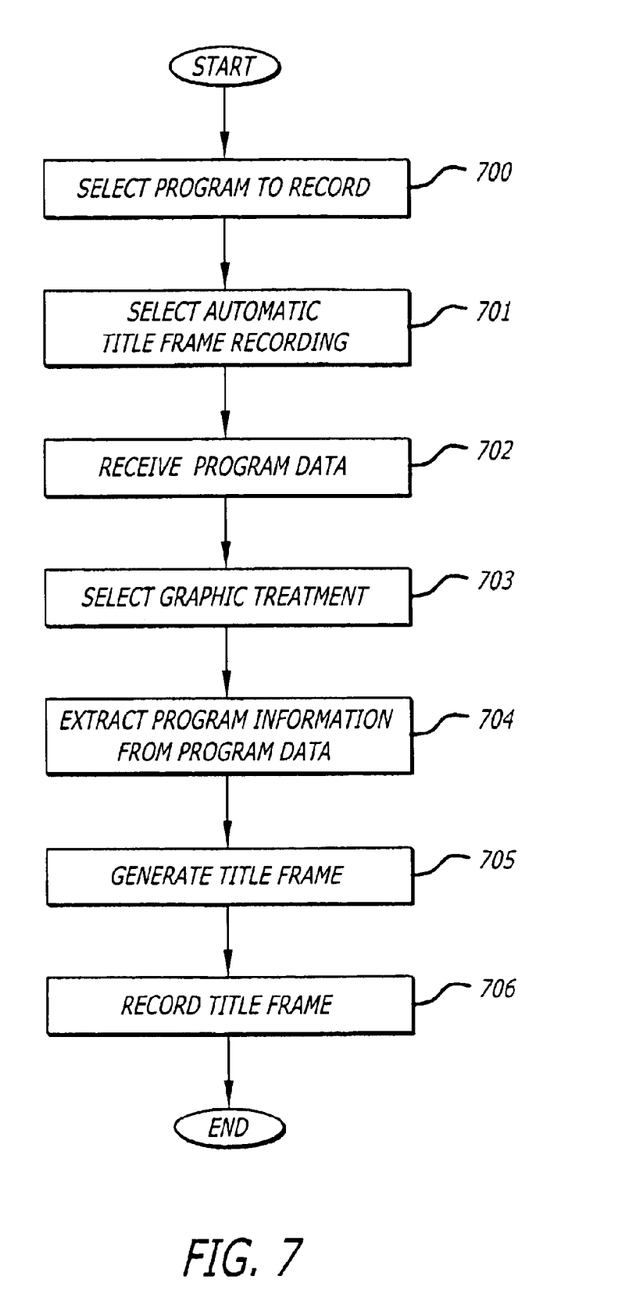
FIG. 7 is an exemplary flow diagram illustrating the process for generating the title frame in accordance with the teachings of the present invention.

FIG. 7 is a flow diagram illustrating an exemplary process for title frame recording. At step 700, a program to be recorded is selected. At step 701, the option to generate a title frame for the selected program is enabled and the user is presented with the current setting. The program data is received by the system in step 702. The program data is part of the transmitted EPG data and may include the program title, the program genre or category such as movies, sports, etc., the program rating, the program description and so on. Such data is system specific and can be system or user configurable. In step 704, the appropriate information from the program data is extracted. In one embodiment of the present invention, the user may pick the information to be placed in the title frame. For example, the user who desires to have only the program description and the program rating placed in the title frame may set up the system such that only the desired information is extracted. The extracted program information is then placed in the title frame. Once generated, the title frame is recorded, as shown in step 706.

In an alternate embodiment, step 703 is executed to provide for the selection of graphic treatments in the title frame according to the content or genre of the program to be recorded or, alternately, according to user preference. Thus, in one embodiment, at step 703, the user selects a desired graphic treatment among the different graphic treatments provided by the system. In an alternate embodiment, the graphic treatment is automatically selected according to the genre of the program to be recorded. This genre or content is, in one embodiment, determined from the program data. Alternately, the information may be determined from other sources including user input. Therefore, at step 705, in one embodiment, the extracted program information is superimposed on the selected graphic treatment to form a title frame that is recorded on the media.

Figure 8:
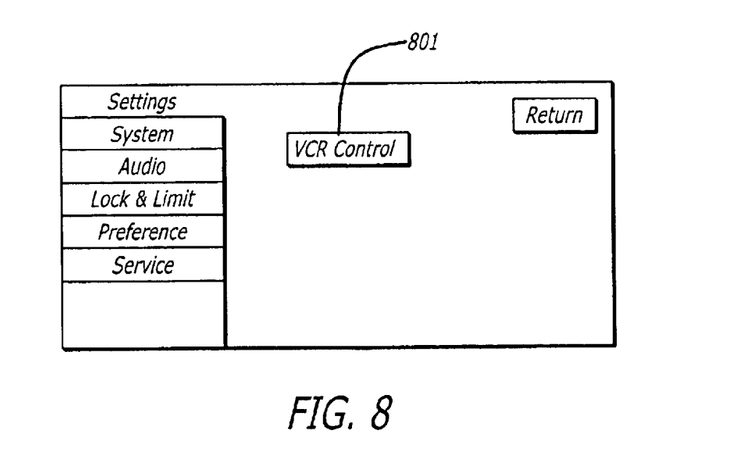
FIG. 8 illustrates an exemplary screen display showing the setting menu.
Figure 9:
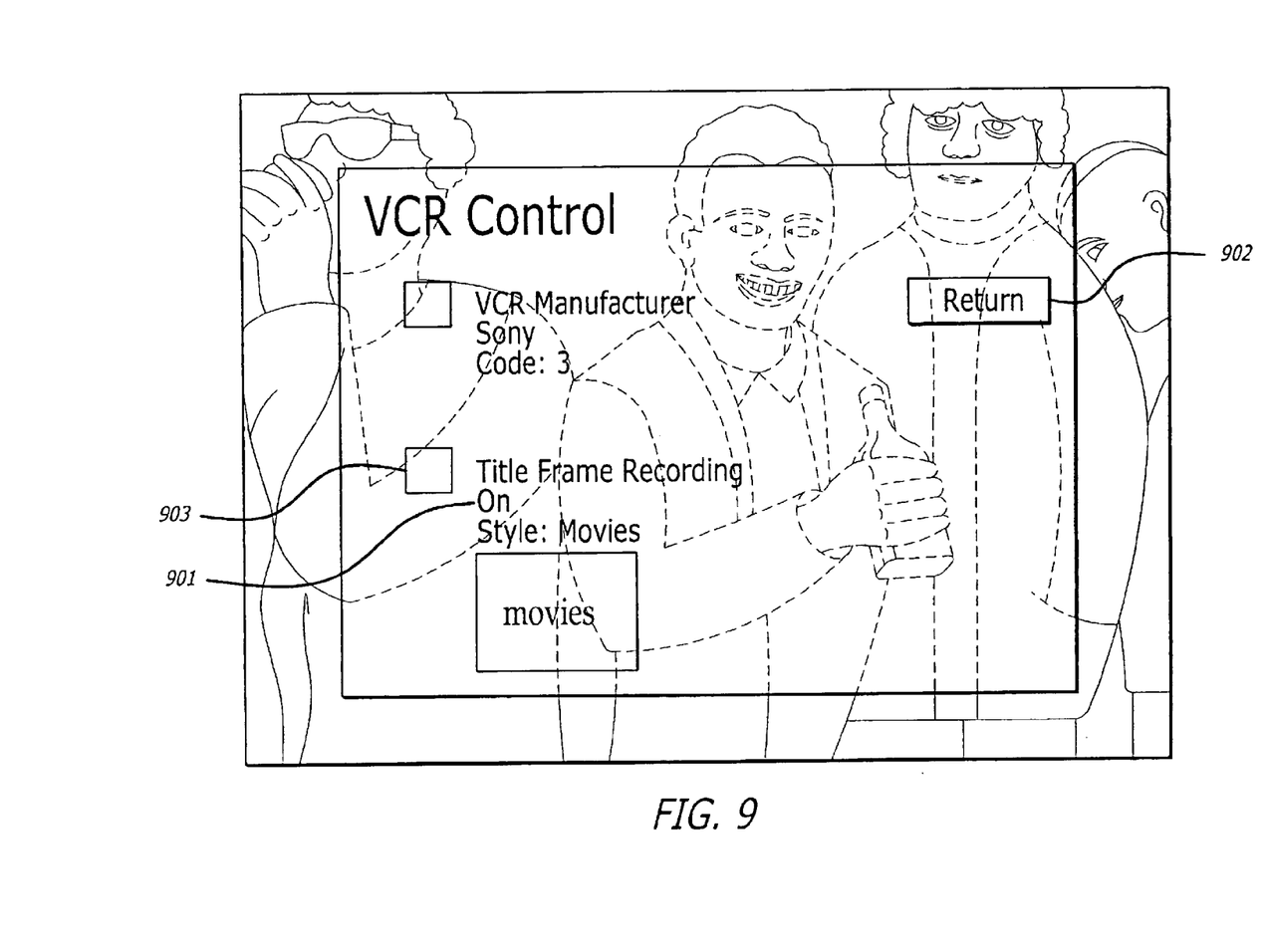
FIG. 9 illustrates an exemplary screen display showing the VCR control menu with the Title Frame Recording option and the current setting.
Figure 10:
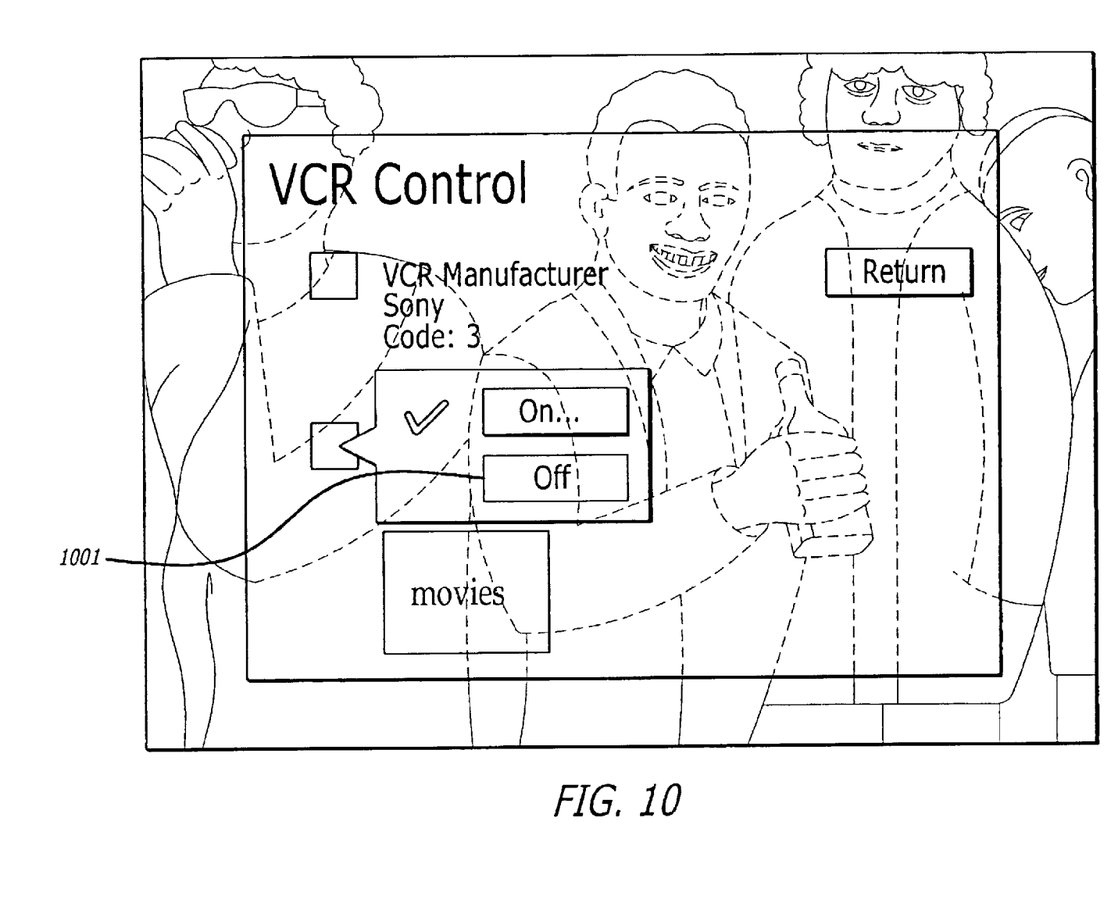
FIG. 10 illustrates an exemplary screen display showing the VCR control menu with the ON and OFF options for Title Frame Recording.

In one embodiment of the present invention, a user who wants to record a program enters a setting menu as shown in FIG. 8 by use of the DSS system remote control. The user selects "VCR Control" option 801 to enter the VCR Control setup menu, as shown in FIG. 9. Here, the current setting 901 of the "Title Frame Recording" option is displayed, as either "On" or "Off". The user has the option to decide whether to change the current setting or to leave it the same. To leave the setting the same, the user simply chooses the "Return" option 902 and return to the setting menu as shown in FIG. 8. To change the setting, the user selects the "Title Frame Recording" button 903 and is presented with the On/Off dialog box 1001 as shown in FIG. 10. When the option is turned on, in this embodiment, the system chooses a pre-selected set up for the title frame. The program information the system receives for the selected program, for example from the satellite broadcast, may be included in the title frame and the title frame is then recorded into the recording medium prior to the recording of the program content. When the option is turned off, the program content is recorded without a title frame.

Figure 11:
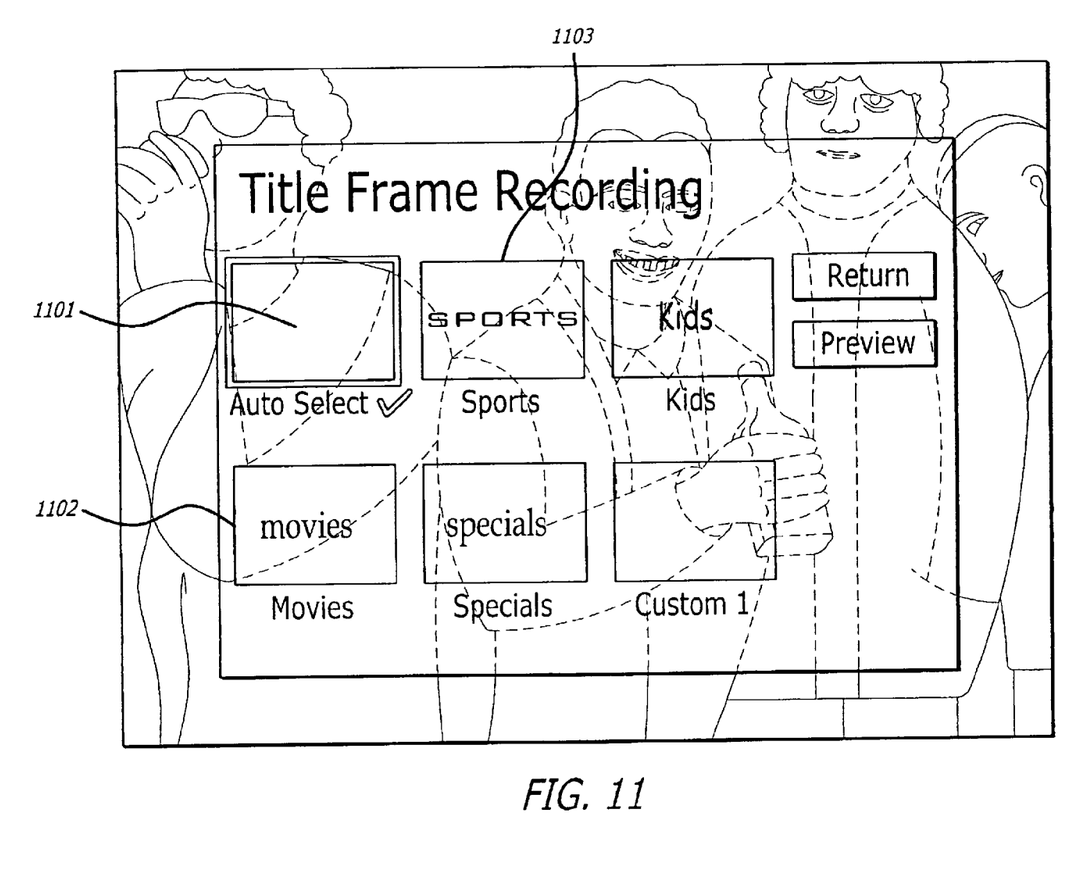
FIG. 11 illustrates an exemplary screen display showing the Title Frame Recording menu with different graphics treatments.

In another embodiment of the present invention, a user is presented with the same menu options as shown in FIG. 8, FIG. 9, and FIG. 10. However, upon selection of "Title Frame Recording" option, a Title Frame Recording Menu is presented. FIG. 11 illustrates a Title Frame Recording menu showing the different graphic treatments that can be used with the title frame. A graphic treatment can be selected automatically by the system when the user selects the "Auto" option 1101. Once the "Auto" option 1101 is selected, the system reads the genre or category data portion of the program information. If the genre data indicates that the program is a movie, the auto option will automatically chooses the movie graphic treatment 1102 for the title frame. Furthermore, if the user chooses to customize the graphic treatment, a different graphic treatment can be manually selected for the title frame. As illustrated in FIG. 11, a sport-minded user may select the sports graphic treatment 1103 as the title frame for all programs whenever that user records a program. To do this, the user would bypass the "Auto" graphic treatment 1101 and select the "Sports" graphic treatment 1103. Once a selection is completed, the user is returned to the menu illustrated in FIG. 9. As discussed above, FIG. 9 illustrates the current setting of the Title Frame Recording option. If the user has selected "Auto" within the Title Frame Recording menu, the display area 901 shows the status of "On-Auto select" along with a corresponding graphic 902 indicating that the "Auto" option has been selected. Accordingly, the graphic 902 would reflect that a "Sports" graphic if the user has selected a "Sport" graphic treatment. In one embodiment, the same graphic 902 is also displayed in the same area of the title frame recording menus such as FIG. 10.

As discussed above, the information placed in the title frame is derived or extracted from the program information and can include information such as the title, the names of the actors and actresses, the summary of the program, the program rating, the length of time of the program, and the date the program is recorded. The information is superimposed on the selected graphic treatment and adds to the overall look of the title frame.

In one embodiment, the different graphic treatments are stored as graphic files in a memory device such as a hard disk or non-volatile memory located within the broadcast receiver, such as an integrated receiver/decoder (IRD) used in DSS system.

In another embodiment of the present invention, a user is provided an ability to customize or alter the graphic treatments to be used in the title frame. For example, the user can request for other graphic treatments to be stored onto the hard disk using the available remote control device and specifically configured menus or through a device such as keyboard coupled to the IRD. Additionally, the user may also be able to customize the program description by overriding the program description using the user's own version.

Figure 12:
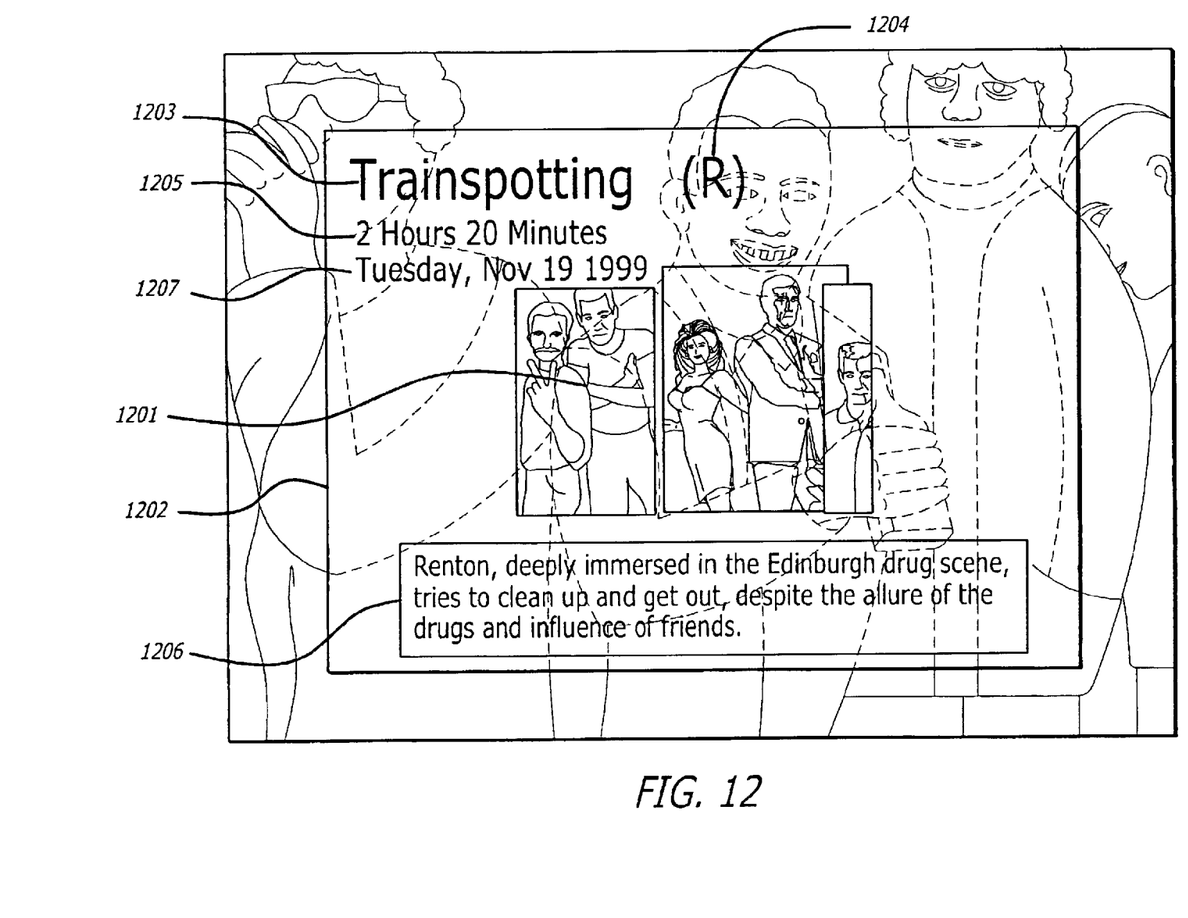
FIG. 12 is an exemplary title frame using the method in accordance with the teachings of the present invention.

FIG. 12 illustrates another embodiment of the present invention where the title frame includes an image 1201 associated with the program whenever the image is available. Certain programs have some identifying images or logos associated with them such that the user will immediately recognize the programs when the images are presented, for example, an image of a movie poster, a cover of a video, or a program logo. In some broadcast systems, the program information may include graphic data of the logo. Alternatively, the receiving device is configured to extract a logo from the broadcast. In the present embodiment, the image 1201 is included in the title frame information. Alternately, the image 1201 may be used to generate the graphic treatment.

The broadcast system may also provide keyword recognition capability and provide keyword graphics as marquees for recognized keywords. For example, the names of the actors and actresses may be highlighted or bordered with marquee graphics in the title frame so that the user can quickly recognize the stars of the program.

FIG. 12 shows an example of the title frame as disclosed by the present invention. The selected graphic treatment 1202 is used as the background of the title frame. Within the title frame is an associated image 1201, the name of the program 1203, the program rating 1204, the program time length 1205, the program description 1206, and the program recorded date 1207.

It should be noted that the techniques of the present invention also apply when recording future programs. Through the electronic programming guide (EPG), the user selects a program that will be broadcasted at some future time. In one embodiment, the system provides the user the option of having the system remind the user at some predetermined time prior to the program being broadcasted. Once reminded, the user may then be presented the option to generate the title frame recording. Alternatively, the system may immediately present the user with the option of setting up the recording menu and accordingly the title frame recording option so that the title frame will be automatically recorded along with the program content whenever the program is broadcasted.

In the foregoing specification, an innovative method and system for providing a way to generate and record title frame along with the program content has been described. The invention has been described with reference to specific exemplary embodiments thereof. It will, however, be evident that various alternatives, modifications, changes, and uses made be made thereto without departing from the broader spirit and scope of the invention as set forth in the appended claims. The specification and drawings are, accordingly, to be regarded in an illustrative rather than a restrictive sense.

What is claimed is:

1. A method for recording program content of a transmission comprising:
   receiving program information for a program selected for recording;
   generating a title frame for the program, the title frame including one of customized information and the received program information;
   recording the title frame prior to recording the program content;
   placing the program information in the title frame if the user selects customized information in the title frame;
   placing customized program information in the title frame if the user selects to customize the title frame, the customized program information is one of an extracted program description, a user's program description, and a selected graphic treatment;
   placing the received program information in the title frame corresponding to a default setup if the use does not select to customize the title frame;
   placing an image in the title frame; and
   assigning marquee graphics to recognized keywords in the title frame.

2. The method as set forth in claim 1 wherein the customized program information is one of an extracted program description, a user's program description, and a selected graphic treatment.

3. The method as set forth in claim 1, wherein the image is selected from a group comprising an image of a movie poster, an image of an actor or actress in the program, and a program logo.

4. The method as set forth in claim 1, wherein the recognized keywords are selected from the group comprising the names of actors and actresses, the program rating, and the program time length.

5. A method for automatically generating a title frame when a user records program content available through a transmission comprising:
   receiving program information for a program to be broadcasted;
   extracting content data from the program information;
   selecting a graphic treatment for the title frame based on the content data, wherein selecting a graphic treatment comprises selecting a graphic from a plurality of graphics, each graphic corresponding to the respective content data;
   generating the title frame using the program information and the selected graphic treatment; and
   recording the title frame.

6. A method automatically generating a title frame when a user records program content available through a transmission comprising:
   receiving program information for a program to be broadcasted;
   extracting content data from the program information;
   selecting a graphic treatment for the title frame baud on the content data;
   generating the title frame using the program information and the selected graphic treatment, generating the title frame using the program information comprising placing the program information and the selected graphic treatment in the title frame; and
   recording the title frame.

7. The method as set forth in claim 6 wherein placing program information comprises superimposing the selected program information over the selected graphic treatment.

8. An apparatus comprising:
   a memory configured to store graphic treatments to be placed in a title frame;
   an input device configured to receive transmissions of program content and program information; and
   a processor coupled to the memory and the input device, the processor configured to control generation of a title frame for a program to be recorded and recording of the title frame prior to recording of the program content, the title frame including one of customized information and the received program information.

9. The apparatus as set forth in claim 8 wherein the processor is further configured to select a graphic treatment to use in the title frame.

10. The apparatus as set forth in claim 9 wherein the graphic treatment is selected based upon content data, the content data being transmitted with the program information.

11. The apparatus as set forth in claim 9 wherein the program information is used to generate description in the title frame.

12. The apparatus as set forth in claim 8 wherein the customized program information is one of an extracted program description, a user's program description, and a selected graphic treatment.

13. An apparatus for generating title frame recording comprising:
   means for receiving program information for a program to be recorded;
   means for extracting content data from the program information;
   means for selecting graphic treatment corresponding to the content data; means for generating a title frame using the program information and the selected graphic treatment;
   means for controlling the recording of the title frame before recording program content; and
   means for connecting to an external input devices, the external input device allowing a user to customize the title frame.

14. A computer readable medium comprising instructions which when executed by a processing system, perform operations to record a program content comprising:
   receiving program information and content data for a program selected for recording;
   generating a title frame for the program, the title frame including one of customized information and the received program information;
   recording the title frame prior to recording the program content;
   determining if the user selects to customize information in the title frame;
   placing customized program information in the title frame if the user selects to customize the title frame; and
   placing the received program information in the title frame corresponding to a default setup if the user does not select to customize the title frame.

15. The computer readable medium as set forth in claim 14 wherein generating a title frame for the program comprises selecting a graphic treatment for the title frame and placing the program information in the title frame.

16. The computer readable medium as set forth in claim 14 wherein the customized program information is one of an extracted program description, a user's program description, and a selected graphic treatment.

17. A computer readable medium comprising instructions, which when excused by a processing system, perform operations to record a program content comprising:
   receiving program information and content data for a program selected for recording;
   selecting a graphic treatment for a title frame for the program, the graphic treatment being selected based upon the content data, wherein selecting a graphic treatment comprises selecting a graphic from a plurality of graphics, each graphic corresponding to the respective content data;
   generating a title frame for the program using the selected graphic treatment and the program information; and
   recording the title frame prior to recording the program content.

18. A computer readable medium comprising instructions, which when executed by a processing system, perform operations to record a program content comprising:
   receiving program information and content data for a program selected for recording;
   selecting a graphic treatment for a program title frame for the program, the graphic treatment being selected based upon the content data, wherein selecting a graphic treatment comprises selecting a graphic from a plurality of graphics, each graphic corresponding to the respective content data;
   generating a title frame for the program using the selected graphic treatment and the program information comprises placing the program information and the selected graphic treatment in the title frame; and
   recording the title frame prior to recording the program content.

* * * * *